Aug. 21, 1956

C. M. COCKRELL 2,759,328

PRESSURIZED HEATER FOR PRODUCING HOT PROCESS WATER
IN LARGE QUANTITIES FROM SCALE-FORMING WATER

Filed April 2, 1952

INVENTOR.
CLIFFORD M. COCKRELL
BY
Pollard and Johnston
ATTORNEYS

# United States Patent Office 2,759,328
Patented Aug. 21, 1956

2,759,328

PRESSURIZED HEATER FOR PRODUCING HOT PROCESS WATER IN LARGE QUANTITIES FROM SCALE-FORMING WATER

Clifford M. Cockrell, Port Sulphur, La., assignor to Freeport Sulphur Company, New York, N. Y., a corporation of Delaware Application April 2, 1952, Serial No. 280,082

5 Claims. (Cl. 60—39.56)

This invention relates to a direct contact pressure combustion heat exchanger particularly adapted for use in heating large quantities of scale-forming water, sea water, or similar liquid, to temperatures well above 212° F.

As discussed in copending application Serial Number 280,083, filed April 2, 1952, many industrial processes require large volumes of heated water and frequently the temperature must be well over 212° F. As an example, water over 250° F. is needed in the Frasch process of sulphur mining. If the water has scale-forming or corrosive properties, the scale or precipitate will tend to deposit on heat transfer surfaces in the conventional indirect heater which will reduce efficiency and will give other undesirable effects. If acid is introduced for the purpose of inhibiting scale formation, the water may become quite corrosive so that such is not practicable.

One of the main objects of the present invention is to provide an improved direct contact pressure combustion heater unit especially adapted for heating of large quantities of sea, saline, or similar type water or liquid.

A further object of the invention is to provide heat exchange apparatus in which sea or similar water can be heated efficiently and without undesirable effects to a temperature above that causing deposition of scale in the conventional indirect heat exchanger.

The pressure employed in the direct contact pressure combustion heater is chosen so as to be sufficiently high to maintain a partial pressure of steam equivalent to the temperature of the water to be furnished at the outlet of the heater for process purposes. When water is heated at atmospheric pressure in a direct contact heater, it cannot be heated to more than about 190° F., because each volume of gas leaving carries with it sufficient water vapor to limit the maximum water temperature to approximately 190° F. by evaporation. When the term "water" is used herein, it includes other liquids where appropriate.

In one aspect of the invention, the heat exchanger can comprise a pressure tight casing having a combustion chamber, heat transfer zone or zones, and a liquid reservoir at the bottom thereof from which the heated water can be drawn.

The combustion chamber is arranged so that part of the water may be transformed into vapor therein or closely adjacent thereto, the vapor passing upwardly with the flue gases through a first heat transfer zone wherein part of the down-coming water may be transformed into vapor. The gases and water vapor carried therewith then pass upwardly through a second heat transfer zone where the water vapor gives up its latent heat to the incoming water. If desired, water also can be introduced in the form of spray into the combustion chamber, the water rapidly reducing the flame temperature and being transformed into vapor which passes upwardly with the gases. It can be seen that heat transfer to the raw water may take place in two steps or zones. Preferably, the burner is arranged so that radiant heat from its flame may be absorbed by water in the water reservoir.

In a further form of the invention, combustion can be arranged to take place below the water level of the water reservoir, such combustion being known as "submerged combustion." In this instance, heat is transferred by direct contact of the flue gases bubbling through the water being heated. The formed water vapor as it passes upwardly thereafter through the heat transfer zones or packed tower portion of the pressure vessel will release heat to the down-coming liquid. In another aspect of submerged combustion, the combustion zone can be in a combustion vessel separate from a packed tower vessel, the gases and water vapor being fed to the second pressure or packed tower vessel having two zones wherein heat transfer takes place as in the upper packed tower portion of the previously described arrangement. In such an instance, the main precipitation of scale-forming substances will take place in the combustion vessel.

These and other objects, advantages, and features of the invention will become apparent from the following description and drawings which are merely exemplary.

Figure 1:
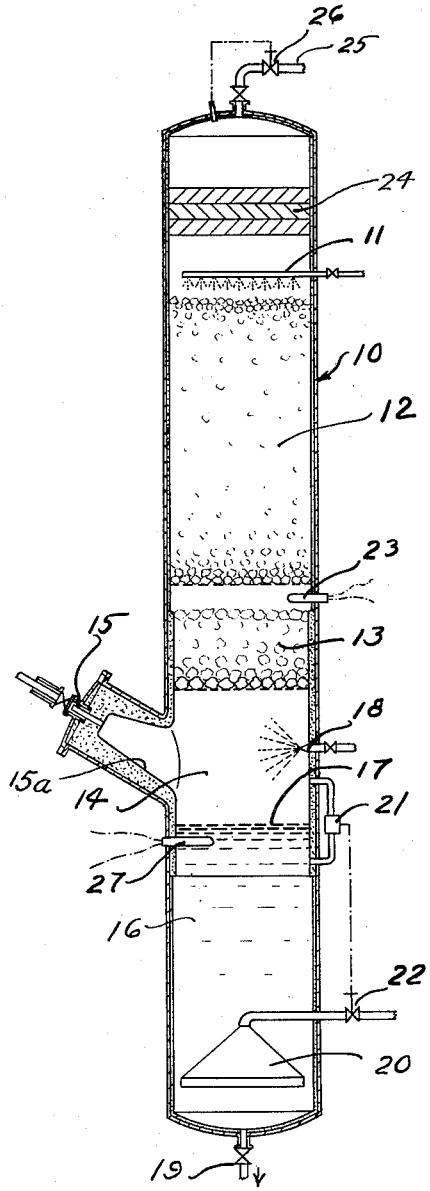
Fig. 1, is a sectional elevation view of one form of the invention.

The direct contact pressure combustion heater of the present invention is particularly useful in process water heating systems such as disclosed in copending applications Serial Number 280,083, filed April 2, 1952, by Clifford M. Cockrell and Serial Number 284,673, filed April 26, 1952, by Vas Hubert Brogdon.

As previously mentioned, the pressure can be chosen so as to be sufficiently high to maintain a partial pressure of steam equivalent to the temperature of the process water desired.

Merely by way of example, if the heated water for process purposes is to be furnished at 300° F., then the pressure should be approximately 100 pounds per square inch absolute (p. s. i. a.). Temperatures above and below 300° F. are contemplated, such as 250° to 350°, but the invention is not limited thereto. Shell 10 can be suitably constructed of metal of sufficient thickness to withstand the pressure at which it is to be operated. The raw or natural water to be heated can be fed to water distributing means 11 in any suitable manner, the water distributing means serving to distribute the water over the entire cross sectional area of the heater. Drift eliminator 24 may be used to prevent water being carried out of the upper part of the heater.

The water to be heated passes downwardly through heat transfer zone 12, preferably, if not necessarily, having packing therein which may be composed of conventional rings, slats, coke, or other suitable material. Next, the water to be heated passes into the lower heat transfer zone 13, which preferably has high temperature resistant packing with open gas passages therein. These zones need not be separate but may instead be a continuous section of packing.

Combustion chamber 14 has a downwardly directed burner means 15 having a lining with radiating surfaces 15a, to which burner air and fuel under pressure are fed. The burner and the lining are arranged so that the most intense part of the heat of the flame and of the resulting combustion gases and of the radiant energy therefrom are directed toward the surface of the water 17 where absorption of intense heat takes place.

In the lower part of the packing, gas temperature, which may be in the range of 2300° to 3000° F., will be reduced quickly and at the same time, some of the water will be converted into water vapor, thereby converting sensible heat in the gas to latent heat in the vapor. Preferably, but not necessarily, a water spray nozzle 18 may spray water into combustion chamber 14.

As flue gas and water vapor pass farther up through the packed tower portion of the heater, water vapor will contact down-coming water and will condense giving up its latent heat. Heated water collects in the water reservoir 16 and sludge or solid matter can be drawn off through the sludge removing conduit 19. A clarification cone or means 20 can be used for withdrawal of the heated water from the pressure heater.

Various controls can be used to govern operation of the heater and to indicate existent conditions. Water level control 21 can be connected to valve 22 in such a manner as to maintain a constant level 17 of water in water reservoir 16. A thermo-couple or suitable thermo-responsive element 23 can be inserted in the heater for the purpose of indicating water failure. The flue gases are withdrawn through flue gas conduit 25 which can be controlled by an automatic pressure control 26. A thermo-responsive low water arrangement 27 also can be furnished, if desired. In addition to the controls and indicators just described, other appropriate controls and indicators can be provided as needed.

Figure 2:
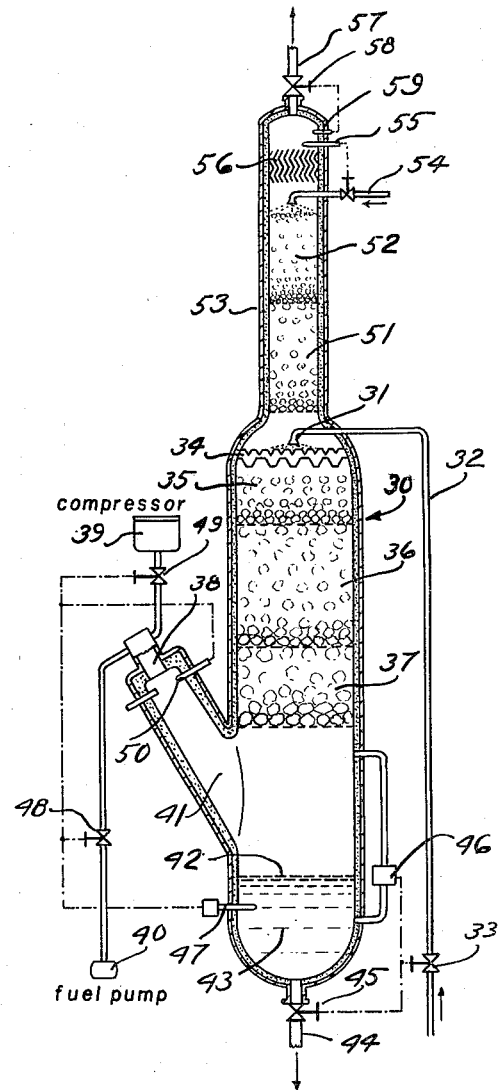
Fig. 2, is a sectional elevation of another form of the invention.

Another form of the invention is shown in Figure 2, this form being generally similar in many details to Figure 1. Main casing 30 may have water distributing means 31 fed by raw water line 32 controlled by a valve 33. Distributing pans 34 can be located in the path of water from distributing means 31 to further distribute water over the medium tower packing 35 defining one of the heat transfer zones. The water to be heated next passes through the coarse tower packing 36 and then over the very coarse or relatively open packing 37.

Burner 38 may have air supplied by a compressor or source 39 and fuel by pump 40. Combustion chamber 41 is arranged so that radiant heat from the flame can be absorbed at the upper surface 42 of heated water level 43. The heated process water line 44 may be controlled by valve 45, valves 33 and 45 being operated by water level control means 46. Thermostatic control 47 can be connected to fuel valve 48 and air valve 49 so as to control the flow of fuel and air thereto. Flame detecting element 50 can be connected to the fuel and air control in a conventional manner.

The flue gases after they have passed the upper heat transfer zone 35 can travel upwardly through the medium tower packing 51 and the fine tower packing 52 located in the reduced section 53 of the heater.

By the use of the invention herein, large quantities of hot process water at a temperature well above 212° F. can be obtained from scale-forming water. Heat transfer is not reduced in the heater by scaling and localized overheating will not occur as in the case of conventional indirect heat exchangers. Radiant heat of the flame will be directly absorbed which will reduce furnace maintenance problems. No circulation problem is involved because heating takes place in a single pass.

If desired, a cold water inlet 54 controlled by a temperature control element 55 can be used to reduce the flue gases to the desired temperature, heat also being absorbed thereby. In the event such becomes desirable or necessary, a drift eliminator 56 can be located above the auxiliary cold water inlet 54. Flue gases can be taken from the heater through line 57 controlled by valve 58 which is connected to pressure control element 59. The flue gas with any water vapor it may contain can be fed to a prime mover or used for any desired purpose as described in the aforementioned copending applications.

The various instruments and special elements employed in the apparatus described herein can be of known or standard construction. The Chemical Engineers Handbook, third edition, published by McGraw-Hill Book Company, Inc. in 1950, discloses suitable structures for these controls and elements including drift eliminators, water level controls, thermo-responsive elements, thermo-responsive low water controls, flame detecting elements, temperature control elements and pressure control elements.

The text entitled, "Water Treatment and Purification," by William J. Ryan also published by McGraw-Hill, in 1937, describes and illustrates the type of distributing pan illustrated in Fig. 2 of the drawing as element 34.

Variations can be made in the details of construction and arrangement without departing from the spirit of the invention except as defined in the appended claims.

What is claimed is:

1. A direct contact heat exchanger adapted to heat scale-forming water to provide large quantities of process water at temperatures well over 212° F. for industrial use comprising a closed vessel with a liquid reservoir zone for collecting heated liquid adjacent the bottom thereof, a combustion chamber for producing hot gases for said vessel, burner means for said combustion chamber, said burner means being downwardly directed at an angle which directs the flame and radiant heat of the burner lining toward the surface of the liquid to be maintained in said liquid reservoir, liquid feed means for introducing scale-forming water into the upper part of said vessel, a water-vaporizing zone in said vessel above the combustion chamber in which the combustion gases come in contact with and vaporize water introduced into the vessel, a condensing zone in said vessel above said water-vaporizing zone in which the latent heat of the water vapor assists in heating the downcoming liquid, means adjacent the top of said vessel for exhausting flue gases, an outlet conduit connected to said vessel at said reservoir zone for conducting the heated process water therefrom to a place of consumption and means maintaining a pressure in said vessel such that the partial pressure of the liquid vapor is equivalent to the temperature to which the liquid is to be heated.

2. A direct contact heat exchanger comprising a closed vessel with a liquid reservoir for collecting heated liquid adjacent the bottom thereof, a combustion chamber for producing hot gases for said vessel, liquid feed means for introducing liquid into the upper part of said vessel, a plurality of heat transfer zones in the path of said liquid as it passes toward the bottom of said vessel from said liquid feed means, the zone above the combustion chamber having relatively open packing and being one in which at least some of the water is converted into vapor, another zone located nearer to the feed means having finer packing than the first mentioned zone and being one in which the latent heat of the water vapor assists in heating the downcoming liquid, means adjacent the top of said vessel for exhausting flue gases, and means maintaining a pressure in said vessel such that the partial pressure of the liquid vapor is equivalent to the temperature to which the liquid is to be heated.

3. A direct contact heat exchanger adapted to heat scale-forming water to provide large quantities of process water at temperatures well over 212° F. for industrial use comprising a closed vessel shell with a liquid reservoir zone therein and a combustion chamber connected thereto, burner means for said combustion chamber, said burner means having a heat radiating lining and being mounted so as to direct downwardly at an angle the flame and radiant heat of the burner lining toward the surface of the liquid to be maintained in said reservoir, means for introducing cool scale-forming water into said vessel including a liquid distributing means spaced from said combustion chamber, heat transfer zone means between said combustion chamber and said liquid distributing means through which liquid passes downwardly in counterflow relationship with upwardly moving combustion gases, packing in said heat transfer zone means, means maintaining a predetermined pressure in said shell, an outlet conduit connected to said reservoir zone for conducting hot process water from said vessel to a point of consumption and liquid level responsive means controlling withdrawal of liquid from said reservoir.

4. A direct contact heat exchanger adapted to heat scale-forming water to provide large quantities of process water at temperatures well over 212° F. for industrial use comprising a closed vessel shell with a liquid reservoir zone therein and a combustion chamber connected thereto, burner means for said combustion chamber said burner means being mounted in the wall of said combustion chamber in such position as to direct downwardly at an angle the flame and radiant heat of the burner toward the surface of the liquid to be meaintained in said reservoir, liquid distributing means spaced from said combustion chamber, heat transfer zone means between said combustion chamber and said liquid distributing means through which liquid passes downwardly in counterflow relationship with upwardly moving combustion gases, packing in said heat transfer zone means, means maintaining a predetermined pressure in said shell, and liquid level responsive means controlling withdrawal of liquid from said reservoir.

5. A direct contact heat exchanger for providing large quantities of hot process water from sea, saline and like natural scale-forming waters comprising a closed vessel shell having a liquid reservoir zone therein substantially at the bottom thereof, a combustion chamber in said shell directly above said zone, burner means connected to said combustion chamber, said burner means having a heat radiating lining and being mounted so as to direct downwardly at an angle the flame and radiant heat of the burner lining toward the surface of the water to be maintained in said reservoir, means for introducing cool scale-forming water into said vessel including a liquid distributing means spaced from and above said combustion chamber, heat transfer zone means between said combustion chamber and said liquid distributing means through which liquid passes downwardly in counterflow relationship with upwardly moving combustion gases, packing in said heat transfer zone means, means maintaining a predetermined pressure in said shell, an outlet conduit connected to said reservoir zone at a level above the bottom end of said vessel for conducting hot process water from said vessel to a point of consumption, a conduit connected to said vessel in the bottom thereof for removal of sludge and solid material settling in said reservoir zone, and liquid level reservoir means controlling withdrawal of water from said reservoir zone.

References Cited in the file of this patent

UNITED STATES PATENTS

| | | |
|---|---|---|
| 1,068,348 | Kraus | July 22, 1913 |
| 1,227,275 | Kraus | May 22, 1917 |
| 1,230,417 | Lillie | June 19, 1917 |
| 1,478,067 | Seidler | Dec. 18, 1923 |
| 1,491,486 | Marquard et al. | Apr. 22, 1924 |
| 1,504,839 | Ringbom | Aug. 12, 1924 |
| 1,560,806 | Schackher | Nov. 10, 1925 |
| 1,864,402 | Bodemuller | June 21, 1932 |
| 2,139,760 | Losche | Dec. 13, 1938 |
| 2,568,506 | Mercer | Sept. 18, 1951 |